United States Patent
Lee et al.

(10) Patent No.: US 9,881,154 B2
(45) Date of Patent: Jan. 30, 2018

(54) HARDWARE-ASSISTED LOG PROTECTION DEVICES AND SYSTEMS

(71) Applicant: Georgia Tech Research Corporation, Atlanta, GA (US)

(72) Inventors: Junghee Lee, Atlanta, GA (US); Jongman Kim, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 116 days.

(21) Appl. No.: 15/023,521

(22) PCT Filed: Sep. 20, 2013

(86) PCT No.: PCT/US2013/060964
§ 371 (c)(1),
(2) Date: Mar. 21, 2016

(87) PCT Pub. No.: WO2015/041685
PCT Pub. Date: Mar. 26, 2015

(65) Prior Publication Data
US 2016/0210455 A1 Jul. 21, 2016

(51) Int. Cl.
*H04L 29/06* (2006.01)
*G06F 21/55* (2013.01)

(52) U.S. Cl.
CPC .... *G06F 21/552* (2013.01); *G06F 2221/2153* (2013.01)

(58) Field of Classification Search
CPC ............... G06F 21/552; G06F 2221/2153
(Continued)

(56) References Cited

U.S. PATENT DOCUMENTS 8,396,830 B2* 3/2013 Sutoh .................. G06F 11/1471
707/610
8,594,288 B2* 11/2013 Robbins .......... H04M 1/274516
379/142.06
(Continued)

OTHER PUBLICATIONS

Control middleware for open robot controllers, Xu et al, 10.1109/ICCAS.2007.4406777, IEEE ,2007.*
(Continued)

*Primary Examiner* — Jahangir Kabir
(74) *Attorney, Agent, or Firm* — Troutman Sanders LLP; Ryan A. Schneider

(57) ABSTRACT

A hardware-assisted technique may protect a system log from attackers, regardless of an attacker's acquired privileges at the host system. In some embodiments, the technique may employ specialized hardware, e.g., in the form of an add-on peripheral card. The hardware may be connected to a commodity server through a standard bus. Said hardware may stores log files from a host system while permitting only read and append operations from the host system. Thus, even if the attacker obtains root privileges at the host system, removal through the host system of logs may be prevented because the asymmetric interface does not support such commands from the host system. In some embodiments, an existing log file storage path at the host system may be maintained, reducing the required change to implement the disclosed techniques within existing server setups. Further, any performance degradation due to the techniques may be small to negligible.

20 Claims, 5 Drawing Sheets

(58) Field of Classification Search
USPC .......................................... 726/2, 3, 27, 30
See application file for complete search history.

(56) References Cited

U.S. PATENT DOCUMENTS

| | | |
|---|---|---|
| 2007/0110070 A1 | 5/2007 | Chang et al. |
| 2007/0185924 A1* | 8/2007 | Kawamura ......... G06F 11/2071 |
| 2008/0291210 A1 | 11/2008 | Partani et al. |
| 2009/0044046 A1* | 2/2009 | Yamasaki ........... G06F 11/2082 |
| | | 714/6.1 |
| 2010/0291920 A1 | 11/2010 | Lerzer et al. |
| 2011/0106771 A1* | 5/2011 | McDonald ........ G06F 17/30194 |
| | | 707/663 |
| 2012/0239879 A1 | 9/2012 | Kawakami et al. |
| 2012/0307287 A1* | 12/2012 | Motosugi ............... G06K 15/00 |
| | | 358/1.14 |
| 2013/0145085 A1 | 6/2013 | Yu |

OTHER PUBLICATIONS

The International Search Report and Written Opinion in related PCT Application No. PCT/US2013/060964, dated Apr. 4, 2014.

\* cited by examiner

HARDWARE-ASSISTED LOG PROTECTION DEVICES AND SYSTEMS

CROSS-REFERENCE TO RELATED APPLICATIONS

This application is a US National Stage of International Application No. PCT/US2013/060964, filed 20 Sep. 2013, herein fully incorporated by reference.

BACKGROUND

A log file, or log, is a recording of events taking place in the execution of a system in order to provide an audit trail. The audit trail can be used to understand the activity of the system and to diagnose problems. In effect, a log file may be considered a black box, or closed-circuit television (CCTV), for a computer system. Logs may be generated by the operating system (OS) kernel, as well as by various server applications, e.g., web, domain name, mail, and database servers. When system administrators suspect a potential attack, they typically turn to logs to investigate the attack. By examining the logs, an administrator may detect committed attacks, unsuccessful trials, and potential threats.

Since modern attackers are aware of this recorded evidence, attackers often try to remove traces of their attacks from logs whenever possible. Accordingly, making system logs tamper proof and ensuring that the removal of traces from such logs is impossible has become imperative in this time of escalating cyber-attacks.

The criticality of information contained within system logs has been widely recognized by researchers. There have been several software-based and hardware-assisted approaches for protecting logs. These conventional approaches aim to protect logs from unauthorized access through encryption. However, the log files are typically still stored on hard disk drives (HDD). Should an attacker manage to obtain root privileges at a computer system, encryption cannot safeguard logs from information removal as the attacker may simply delete or corrupt the entire HDD.

SUMMARY

Accordingly, there is a need for techniques that protect system logs from attackers, regardless of the attackers' acquired privileges within the system. This and other needs may be addressed by certain embodiments of the disclosed technology.

Certain embodiments include a novel hardware-assisted technique employing specialized hardware in the form of an add-on peripheral card. The add-on card may be connected to a commodity server through a standard bus. In some embodiments, the card may store logs from a host system through an asymmetric interface permitting only read and append operations from the host system. Thus, even if the attacker obtains root privileges at the host system, removal of logs through the host system may be hindered because the hardware does not support the corresponding commands from the host interface.

According to an example embodiment, a device is provided. The device may include a memory configured to store log messages, and a controller operationally coupled to the memory, the controller comprising a file system for accessing the memory. The device may further include a first interface for operationally coupling a first computer to the controller, and a second interface for operationally coupling a second computer to the controller. The first interface may be configured to transmit log messages and file commands between the first computer and the controller. The second interface may be configured to transmit log messages and file commands between the second computer and the controller. The controller may be further configured to perform file operations based on file commands received through the first interface and second interface, wherein the controller permits only non-destructive file operations based on commands transmitted through the first interface but permits non-destructive and destructive file operations based on commands transmitted through the second interface.

According to another example embodiment, a system is provided. The system may include a device and a logical device driver. The device may include a memory configured to store log messages, and a controller operationally coupled to the memory, the controller comprising a file system for accessing the memory. The device may further include a first interface for operationally coupling a first computer to the controller, and a second interface for operationally coupling a second computer to the controller. The first interface may be configured to transmit log messages and file commands between the first computer and the controller. The second interface may be configured to transmit log messages and file commands between the second computer and the controller. The controller may be further configured to perform file operations based on file commands received through the first interface and second interface, wherein the controller permits only non-destructive file operations based on commands transmitted through the first interface but permits non-destructive and destructive file operations based on commands transmitted through the second interface. The logical device driver may be installed at the first computer, and configured to enable communication through the first interface between the first computer and the controller.

According to another example embodiment, a device is provided. The device may reside on an expansion card to a host computer and include a NAND memory configured to store log messages, and an ARM-based controller operationally coupled to the NAND memory, the ARM-based controller comprising a file system for accessing the NAND memory. The device may further include a SATA interface for operationally coupling the host computer to the ARM-based controller, and a UART interface for operationally coupling an administrator computer to the embedded ARM-based controller. The SATA interface may be configured to transmit log messages and file commands from the host computer to the ARM-based controller. The UART interface may be configured to transmit file commands from the administrator computer to the ARM-based controller and transmit log messages from the ARM-based controller to the administrator computer. The ARM-based controller may be further configured to perform file operations based on file commands received through the SATA interface and UART interface, wherein the ARM-based controller permits only non-destructive file operations based on commands transmitted through the SATA interface but permits non-destructive and destructive file operations based on commands transmitted through the UART interface. The ARM-based controller may be yet further configured to automatically delete older log messages stored in the NAND memory responsive to the NAND memory reaching a predetermined capacity.

Other embodiments, features, and aspects of the disclosed technology are described in detail herein and are considered a part of the claimed disclosed technology. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
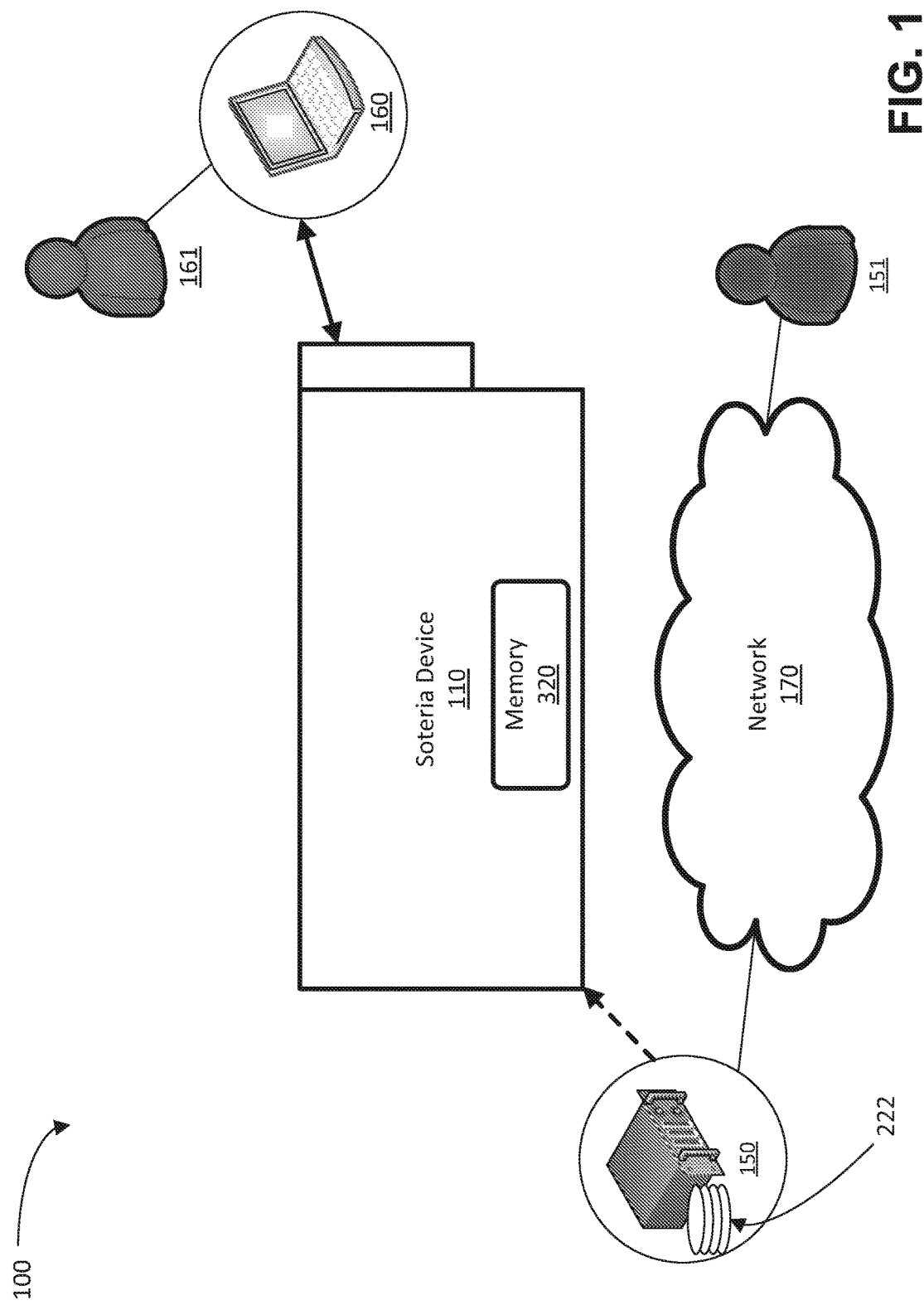
FIG. 1 depicts a block diagram of an illustrative log-protection scheme 100, according to an example embodiment.

Embodiments of the disclosed technology include devices, systems, and apparatus providing a hardware-assisted log-protection technique. According to certain embodiments, the disclosed technique may protect a system log from attackers, regardless of an attacker's acquired privileges at the host system. In some embodiments, the disclosed technique may employ specialized hardware in the form of an add-on peripheral card. The add-on card may be connected to a commodity server through a standard bus. Said hardware, aptly named for Soteria, the Greek goddess of safety and recovery from harm, may stores log files from a host system while permitting only read and append operations from the host system. Thus, even if the attacker obtains root privileges at the host system, removal through the host system of logs (or information contained therein) may be hampered or prevented because the asymmetric interface of the Soteria Device does not support such commands from the host system. Moreover, in some embodiments, an existing log file storage path at the host system may be maintained, reducing the required change to implement the disclosed techniques within existing server setups. Further, performance degradation due to the hardware-assisted log-protection technique may be small to negligible.

Throughout this disclosure, certain embodiments are described in exemplary fashion in relation to an add-on peripheral card for protecting log files. However, embodiments of the disclosed technology are not so limited, and the disclosed technique may be at least partially embodied in, for example, a peripheral device external to an enclosure of a host system, or integrated in the host system mainboard. Moreover, some embodiments the disclosed technique may be used with various types of standard computer buses.

Some embodiments of the disclosed technology will be described more fully hereinafter with reference to the accompanying drawings. This disclosed technology may, however, be embodied in many different forms and should not be construed as limited to the embodiments set forth therein.

In the following description, numerous specific details are set forth. However, it is to be understood that embodiments of the disclosed technology may be practiced without these specific details. In other instances, well-known methods, structures and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various devices, systems, and apparatus may be used to provide the hardware-assisted log-protection technique, according to example embodiments of the disclosed technology, and will now be described with reference to the accompanying figures.

Soteria Log Protection System

FIG. 1 depicts a block diagram of an illustrative log-protection scheme 100, according to an example embodiment. As shown in FIG. 1, a host system 150 such as a server may store log files generated from an OS or server application running at the host system. Conventionally, these logs are stored on a storage medium 222, e.g. a hard disk device (HDD), of the host system.

Because a server must expose some part of its operation in order to fulfill its role of servicing requests from clients, the server may be vulnerable to various types of remote attacks. When a system administrator 161 detects or suspects an attack, he or she typically investigates by examining the system logs. By analyzing the information contained within the logs, the administrator may identify the type of perpetrated or attempted attack, where the attacks originated from, and possibly how to defeat them.

An attacker 151 who manages to obtain root privilege at a host system 150 may make changes to any editable file at the host system, including the logs. If the logs are removed or tampered with, it may be extremely difficult for the administrator to deal with an attack. Moreover, the administrator may not even be aware of an attack if the logs are fabricated. Conventional techniques for protecting logs rely on encrypting the log files stored at the storage medium 222. However, even encrypted logs stored on a HDD may be vulnerable to an attacker, especially an attacker with escalated privileges at the host system 150. For example, an attacker may be able to delete, overwrite, or otherwise corrupt the entire HDD.

According to certain embodiments of the disclosed technology, the log files may be also or instead be stored on memory 320 associated with specialized log-protection device peripheral to the host system, referred to herein as the "Soteria Device" 110. In some embodiments, the Soteria Device may include, be, or reside on an add-on card or expansion card to the host system 150, although it does not have to be, as described later herein.

According to certain embodiments, and as explained further herein, the Soteria Device 110 may support only non-destructive file commands sent through a host interface from the host system 150. Accordingly, the Soteria Device may be hardened to log tampering as destructive file commands (e.g., commands triggering deletion operations) sent from the host system will be not be honored by the Soteria Device.

In some embodiments, the Soteria Device 110 may provide a second, or administrator, interface for communication with a second administrator system 160. Thus, a system administrator or other authorized user 161 may access and manage log files stored by Soteria Device though a wholly separate interface. In some embodiments, the Soteria Device may support both destructive and non-destructive file commands sent through the second interface from the administrative system.

According to certain embodiments, the disclosed techniques may be effective even assuming the strongest adversary, i.e., an attacker 111 that can obtain root privileges and make changes to any software at the host system, including the OS, device drivers, file systems, and applications. A lone assumption is that the attacker is limited accessing the host system remotely, e.g., over a network 170. In other words, the attacker is assumed to be unable to physically access a server. This is not unreasonable, as physical access to servers is typically restricted to system administrators.

Of course, if an attacker 151 obtains root privileges at the host system 150, the attacker may be able pause logging or begin generating forged logs after the intrusion. However, the attacker cannot make changes to existing logs that were generated before the intrusion. Thus, if the attacker obtains root privileges by using some sort of hacking tool, the history of using the tool may be indelibly captured in the logs. Accordingly, a location where the attack originated from may also appear in the log file. Therefore, the logs may still hold valuable information for the administrator to investigate.

In addition to protecting log files, certain embodiments may do so with minimal change to servers and negligible performance impact. To be practical, implementing a log protection technique should not require drastic change to a host system 150. A protection technique that would involve recompilation of a server application, for example, a web server, may be undesirable (or even impossible to accommodate). Furthermore, such disruptive augmentation may not even guarantee compatibility with other existing tools the administrator currently employs. Instead, it may be desirable for the system software—such as the OS and device drivers—to seamlessly support the log protection technique, without modification to the server applications. Moreover, the log protection technique should not degrade system performance significantly. If the technique has substantial impact on system performance, it will not see widespread adoption, even if it offers perfect protection.

Figure 2:
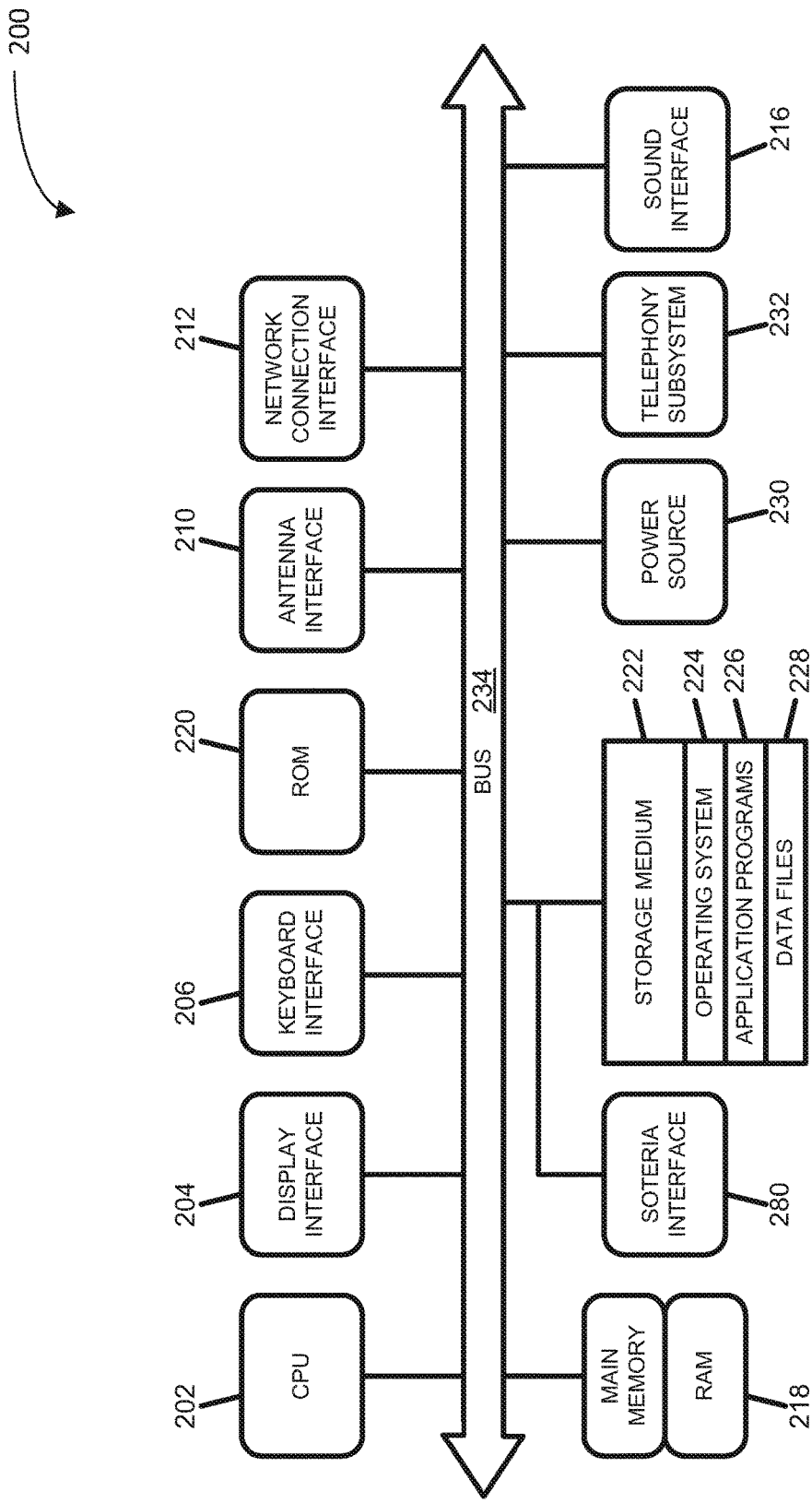
FIG. 2 depicts a block diagram of an illustrative computing device architecture 200, according to an example embodiment.

FIG. 2 depicts a block diagram of an illustrative computing device architecture 200, according to an example embodiment. Certain aspects of FIG. 2 may be embodied in a host system 150 (for example, a server as shown in FIG. 1). As desired, embodiments of the disclosed technology may include a computing device with more or less of the components illustrated in FIG. 2. It will be understood that the computing device architecture 200 is provided for example purposes only and does not limit the scope of the various embodiments of the present disclosed systems, methods, and computer-readable mediums.

The computing device architecture 200 of FIG. 2 includes a central processing unit (CPU) 202, where computer instructions are processed; a display interface 204 that acts as a communication interface and provides functions for rendering video, graphics, images, and texts on the display. In certain example embodiments of the disclosed technology, the display interface 204 may be directly connected to a local display. In another example embodiment, the display interface 204 may be configured for providing data, images, and other information for an external/remote display that is not necessarily physically connected to the computing device.

The computing device architecture 200 may be configured to use an input device via one or more of input/output interfaces (for example, the keyboard interface 206, the display interface 204, network connection interface 212, camera interface 214, sound interface 216, etc.,) to allow a user to capture information into the computing device architecture 200. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 200 or may be a separate device. For example, the input device may be an accelerometer, a magnetometer, a digital camera, a microphone, and an optical sensor.

Example embodiments of the computing device architecture 200 may include an antenna interface 210 that provides a communication interface to an antenna; a network connection interface 212 that provides a communication interface to a network. The display interface 204 may be in communication with the network connection interface 212, for example, to provide information for display on a remote display that is not directly connected or attached to the system. In certain embodiments, a sound interface 216 is provided as a communication interface for converting sound into electrical signals using a microphone and for converting electrical signals into sound using a speaker. According to example embodiments, a random access memory (RAM) 218 is provided, where computer instructions and data may be stored in a volatile memory device for processing by the CPU 202.

According to an example embodiment, the computing device architecture 200 includes a read-only memory (ROM) 220 where invariant low-level system code or data for basic system functions such as basic input and output (I/O), startup, or reception of keystrokes from a keyboard are stored in a non-volatile memory device. According to an example embodiment, the computing device architecture 200 includes a storage medium 222 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 224, application programs 226 (including, for example, a web browser application, a widget or gadget engine, and or other applications, as necessary) and data files 228 are stored. The computing device architecture 200 may also include a Soteria Interface 280 to be described later herein. According to an example embodiment, the computing device architecture 200 includes a power source 230 that provides an appropriate alternating current (AC) or direct current (DC) to power components. According to an example embodiment, the computing device architecture 200 includes and a telephony subsystem 232 that allows the device 200 to transmit and receive sound over a telephone network. The constituent devices and the CPU 202 communicate with each other over a bus 234.

According to an example embodiment, the CPU 202 has appropriate structure to be a computer processor. In one arrangement, the CPU 202 may include more than one processing unit. The RAM 218 interfaces with the computer bus 234 to provide quick RAM storage to the CPU 202 during the execution of software programs such as the operating system application programs, and device drivers. More specifically, the CPU 202 loads computer-executable process steps from the storage medium 222 or other media into a field of the RAM 218 in order to execute software programs. Data may be stored in the RAM 218, where the data may be accessed by the computer CPU 202 during execution. In one example configuration, the device architecture 200 includes at least 228 MB of RAM, and 256 MB of flash memory.

The storage medium 222 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 222, which may comprise a machine-readable storage medium.

Soteria Hardware

Figure 3:
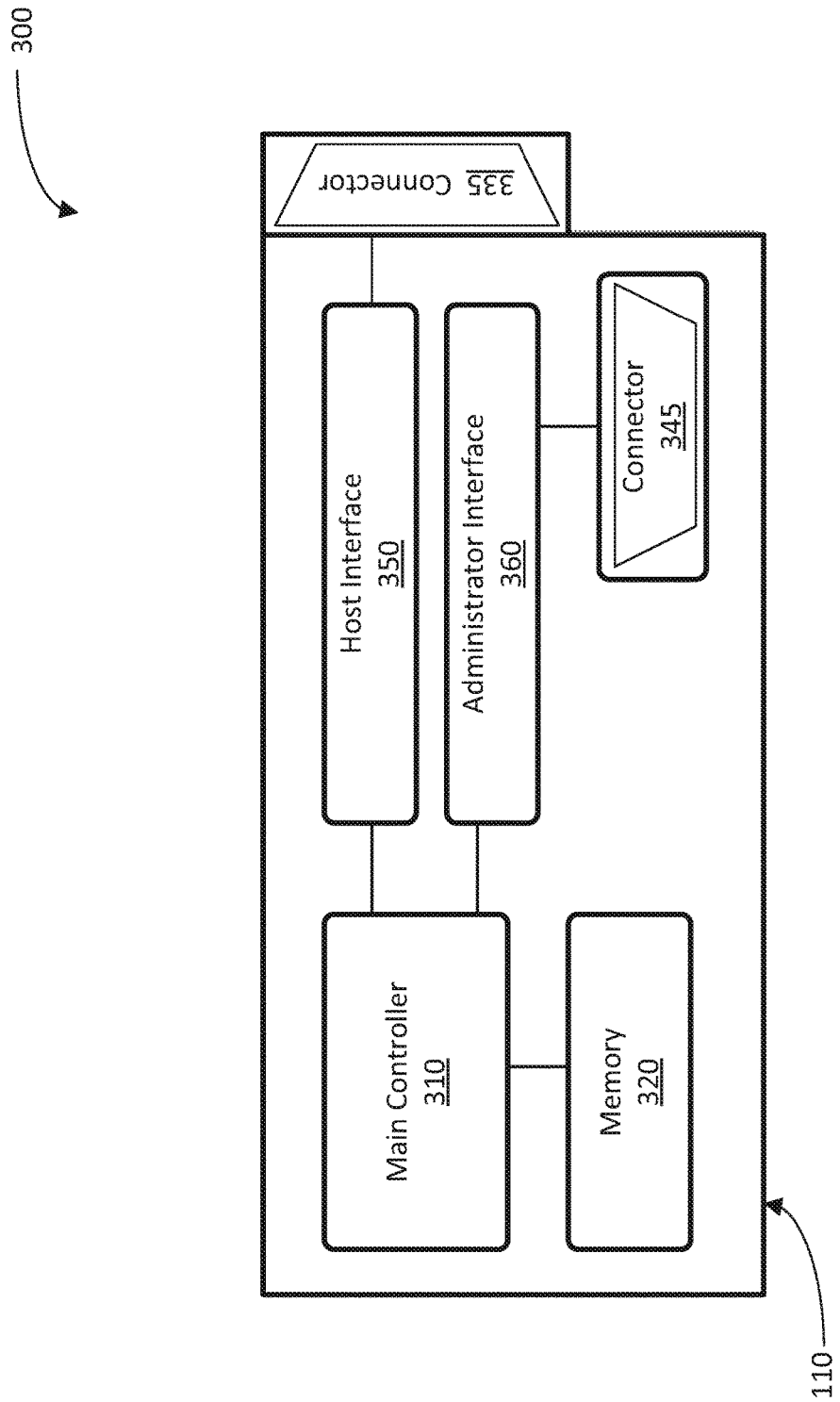
FIG. 3 depicts a block diagram of an illustrative log-protection device architecture 300, according to an example embodiment.

FIG. 3 depicts a block diagram of an illustrative log-protection device architecture 300, according to an example embodiment. As shown in FIG. 3, the Soteria Device 110 may include various hardware components including a memory 320, a main controller 310, a first interface 350 to a host system 150, and a second interface to an administration system 360. The main controller may include or be operable through firmware 410 described later herein.

In some embodiments, the memory 320 may store log messages received from the host system 150 through the host interface 350. In some embodiments, the memory may be a non-volatile memory, such as one or more of NAND flash memory, NOR flash memory, Phase-Change Memory, or Spin-Transfer Torque Memory. In another embodiment, volatile memory may be used, however a power source independent of the host system 150 may be required to ensure the integrity of system logs during a powering down of the host system, or other loss of external power to the Soteria Device 110. Thus, in some embodiments, the Soteria Device may connect to a power source through a power supply or adapter independent of the host system. In another embodiment, the Soteria Device 110 may include and receive power from an integrated or internal battery.

In some embodiments, the main controller 310 may include or implement a file system for accessing or managing log files stored in the memory through circuitry, firmware 410 later described herein, or a combination thereof. Note that the host interface 350 or administrative interface 360 may be each associated with their own controller circuits and firmware. However, the "controller" as referred to herein refers to the main controller 310, unless otherwise specified. In some embodiments, the controller 310 may include an embedded processor. In one embodiment, the controller may be ARM-based or include an ARM-based processor.

The controller 310 may perform file operations based on file commands received through the host interface 350 and the administrator interface 360. In some embodiments, the controller may honor only non-destructive file operations based on commands from the host system 150 send through the host interface. For instance, in one embodiment, the controller may only allow "read" and "append" operations. Thus, log files stored in the memory 320 may not be overwritten or edited through the host system, except to store additional logs. In some implementations, this and other functionality may be implemented at least partially in firmware 410, as described herein.

According to certain embodiments, the host interface 350 may couple the Soteria Device 110 to the host system 150 via a bus of the host system. In some embodiments, the bus may be a standard bus, reducing a need to modify existing servers and other host system. For example, the first interface may connect to a traditionally internal bus, such as, and without limitation, Peripheral Component Interface (PCI), Serial Advance Technology Attachment (SATA), or Small Computer System Interface (SCSI). In another example, the first interface may connect to a traditionally external bus, such as, and without limitation, USB, Firewire, Thunderbolt, eSATA, or SCSI. Note that the foregoing and subsequent lists of buses are intended to be illustrative, not exhaustive, and various other standard and non-standard buses may be used with embodiments the disclosed technology.

According to certain embodiments, the administrator interface 360 may couple the Soteria Device 110 to an administrator system 160 or device. In some implementations, the administrator system may be another machine insulated from the Internet or other network 170 in communication with the host system 150. Through this interface, an administrator may configure and manage the Soteria Device. Since this interface may be physically separate from the host interface, potential attackers may not access this interface unless they obtain physical access to the administrator system or the Soteria Device itself. In some embodiments, the Soteria Device may connect to the administrative system through a standard interface such as, without limitation, Local Area Network (LAN), Universal Asynchronous Receiver/Transmitter (UART), or USB.

According to certain embodiments, the Soteria Device 110 may include, be, or reside on an add-on card or expansion card to the host system 150. For example, the Soteria Device may be embodied in a PCI-express card. In another example, the Soteria Device may at least partially share an expansion card with a network interface controller (NIC), or other device. In some embodiments, the Soteria Device may be physically integrated or embedded in the host system. For example, the Soteria Device may be at least partially integrated into a motherboard or mainboard of the host system. In another embodiment, the Soteria Hardware may be at least partially embodied by a peripheral device external to the host system. For example, the Soteria Device may be a stand-alone self-powered device that connects to a host system via USB. Alternatively, the Soteria Device could be integrated with, or receive power, from the administrative system 160.

The foregoing description of components of the Soteria Device 110 is not intended to be exhaustive and certain embodiments of the Soteria Hardware may optionally include additional hardware components and functionality.

Soteria Firmware

Figure 4:
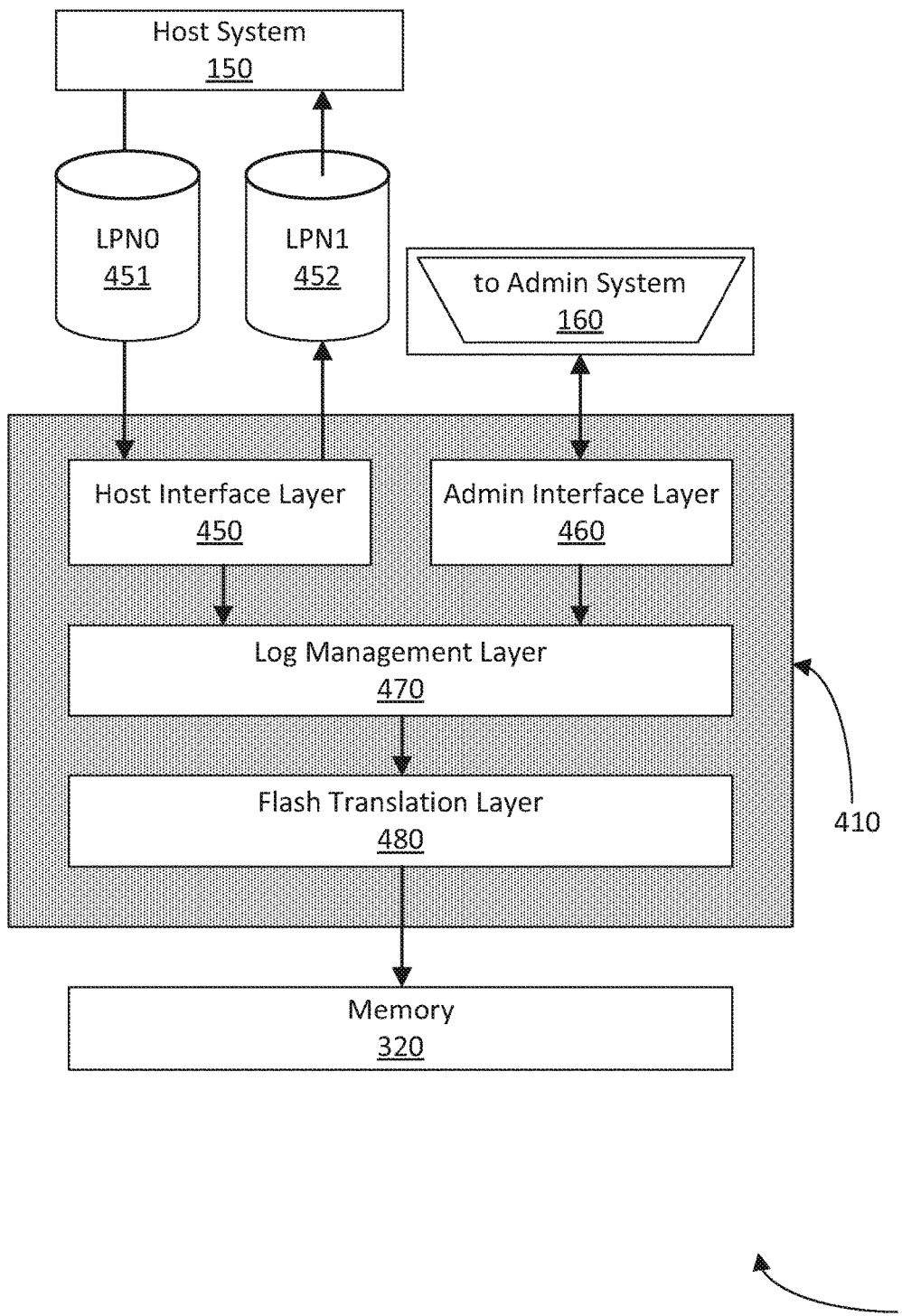
FIG. 4 depicts a block diagram of an illustrative log-protection firmware architecture 400, according to an example embodiment.

FIG. 4 depicts a block diagram of an illustrative log-protection firmware architecture 400, according to an example embodiment. As shown in FIG. 4, the Soteria Firmware 410 may include a log management layer 470, a host interface layer 450, an administrator interface layer 460, and a flash translation layer 480. Note that in some embodiments, various features and functionality disclosed herein as performed by the Soteria Firmware 410 may be implemented all or in part by circuitry or other hardware components such as a field-programmable gate array (FPGA).

The heart of the Soteria Firmware 410 is the log management layer 470. According to certain embodiments, the log management layer may manage logs according to commands issued through the host interface 350, or the administrator interface 360. In some embodiments, the firmware may accept only non-destructive file commands sent through the host interface. However, it may accept both destructive and non-destructive file commands sent through the administrator interface.

The log management layer 470 may implement a simple file system. In some embodiments, it may maintain a file descriptor table that keeps metadata for log files, such as file name, file size, and position pointer. It may also maintain a main data region that stores logs in the memory 320. Whenever an append command is issued, for example, the log management layer may append log data to the end of the data region and updates the metadata accordingly. Since the capacity of NAND flash memory is finite, the data region may eventually become full or reach a threshold capacity where performance suffers. Thus, in some embodiments, the log management layer may delete older logs to make space for newer logs.

The log management layer 470 may operate based on commands given through the host interface 350 and the administrator interface 360. In an example embodiment, the host interface may be a SATA interface. Accordingly, the host interface may interpret the SATA protocol. One way to implement the commands to the log management layer is to modify the SATA protocol, because the SATA protocol also operates based on commands. For example, in one embodiment, the SATA protocol may be extended using unused SATA commands. However, this may require modification to the SATA device driver in the host OS. To reduce or eliminate the need for such modifications, the commands may be implemented on top of the existing SATA protocol, in some embodiments, as described in the following example:

Two logical pipes 451 452 may be implemented on top of the SATA protocol, as shown in FIG. 4. Logical page number 0 (LPN0) 451 may be written exclusively by the host and LPN1 452 may be written by the Soteria Device 110. Under normal SATA protocol, writing to LPN0 means writing data to a physical page associated with LPN0. In some embodiments, this may be interpreted as a command. Similarly, writing data to LPN1 may be interpreted by as a response. Thus, from the perspective of the host system 150, modifying the underlying SATA device driver 550 may be unnecessary. Since there are many variations of SATA device drivers by various manufacturers, modifying the entire SATA device driver may be impractical. Instead, using two logical pipes may require only a simple device driver at the host system for the Soteria Device. The Soteria Device driver may be, thus, agnostic of the manufacturer and platform, because it may work over existing SATA device drivers.

The log management layer 470 may also accept commands through the administrator interface layer 460. In some embodiments, the administrator interface 360 may be connected to an administrator system through a UART terminal. Using the terminal, the administrator may issue commands in a similar fashion as when using a shell. The administrator interface layer may interpret the shell commands and sends responses to a terminal at the administrator system 160.

According to certain embodiments, the memory 320 may be flash memory. Accordingly, the Soteria Firmware 410 may include a flash translation layer 480. The flash translation layer may provide a uniform flat memory space for the log management layer 470. The flash translation layer may be required because of certain physical characteristics of the flash memory. For example, with NAND memory, only the writing of data to erased pages is allowed. An erase operation is performed at the granularity of a block, which contains multiple pages, whereas read and write operations occur at the granularity of a page. However, it takes much longer to erase a block than read or write a page. Therefore, overwriting may incur significant overhead. To mitigate this overhead, an out-of-place update is usually employed. Instead of erasing and writing data to the same page, a logical page is mapped to a different, erased physical page. When erased pages are depleted, a reclaiming mechanism is necessary, which is called Garbage Collection (GC). In some embodiments, the flash translation layer may use these mechanisms to provide a flat memory space, as DRAM/SRAM may for the upper layers.

Host System Software

Figure 5:
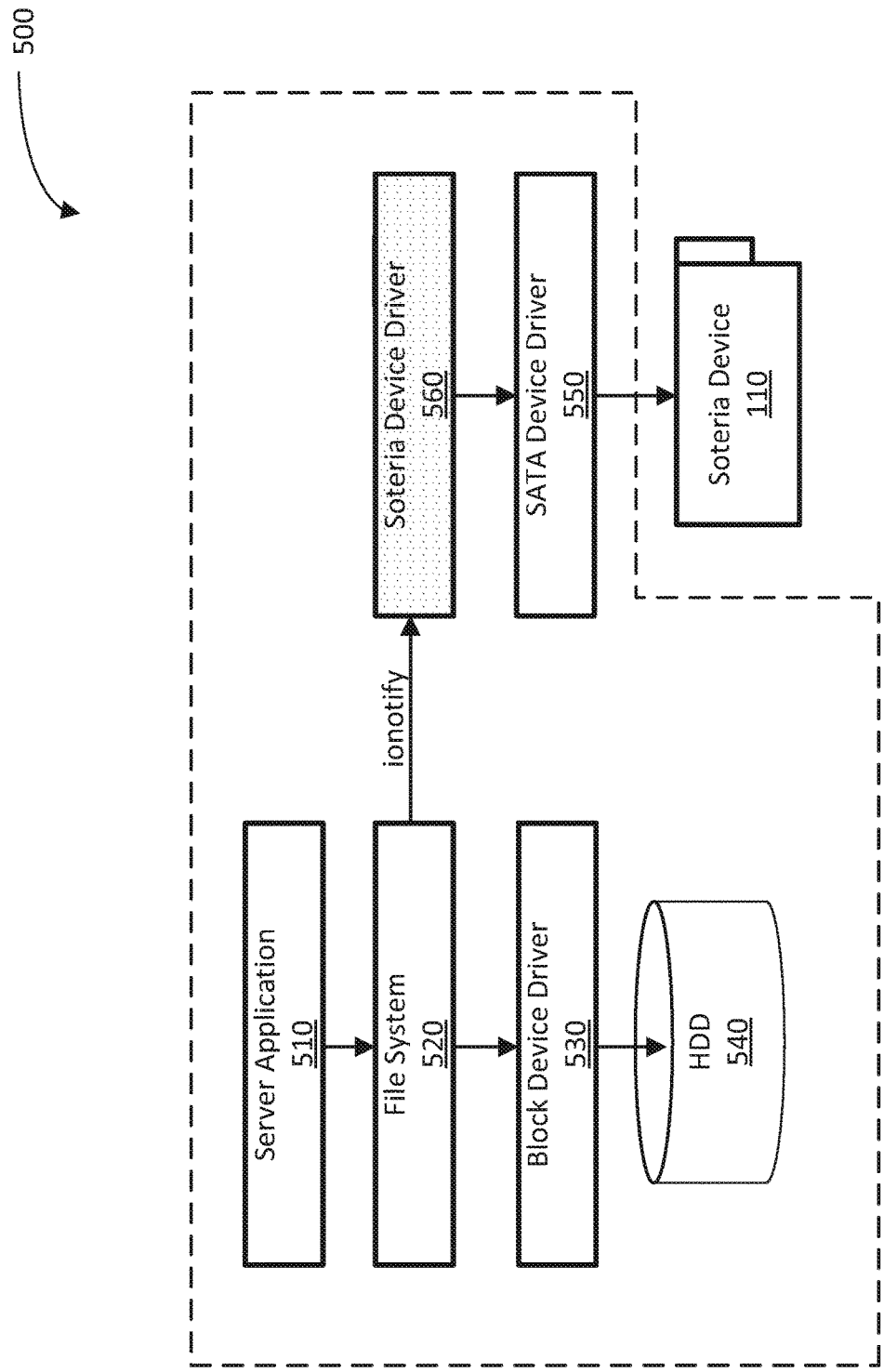
FIG. 5 depicts a flow diagram of an illustrative log-protection system software 500, according to an example embodiment.

FIG. 5 depicts a flow diagram of an illustrative log-protection system software 500, according to an example embodiment. According to certain implementations, the host system 150 may include a server application 510, a file system 520, a block device driver 530, and a local storage medium 222, for example, a HDD 540. Although the main functionality of log management may be implemented within the Soteria Device 110, system software at the host system 150 may be still required to provide an interface for Soteria 280. To minimize modification to existing server systems, according to certain embodiments, only a simple Soteria Device driver 560 is additionally added at the host system, as shown in FIG. 5.

In some embodiments, it may be unnecessary to change an existing path at the host system 150 for storing logs. For example, when a server application 510 at the host system needs to generate logs, it may use Application Programming Interfaces (APIs) provided by a file system, such as open, write, and close. The host file system 520 updates metadata and log data. These may be actually stored on a hard disk drive 540 through a block device driver 530. By not making changes to an existing storage path, some implementations may retain compatibility with existing tools for manipulating logs. Thus, an administrator may be able to keep using a favored log management tool that facilitates querying and analysis of log information.

To snoop logs from the existing path, the inotify capability supported by modern file systems may be exploited. Inotify provides notification when an event occurs to any file. In some embodiments, the Soteria Device Driver 550 may be notified when new log data is written to a log file.

Returning to an example embodiment with a host SATA interface, in some embodiments, a Soteria Device Driver 560 may be installed, which works over the SATA device driver to operate the Soteria Device 110. A device driver is called when its associated device is accessed. To protect multiple log files, a corresponding number of devices need to be created. In the case of the Linux OS, if those devices have the same major number, the same device driver is called. Each device is then identified with a different minor number.

For example, suppose that an administrator wants to protect a log file named "syslog." The administrator may first create a device that is to be linked with the log file. They may assign its major number as 60 and minor number as 0. Under Linux, a device can be created by the shell command "mknod /dev/ssc0 c 60 0". Although SATA devices are block devices, the Soteria device may be created as a character device, because it operates based on commands. Subsequently, the administrator may link the log file to the device by using the shell command "tail -F syslog > /dev/ssc0". By this command, whenever new data is written to syslog, it may be also written to the Soteria device.

Note that this command is compatible with log rotation. To prevent a log file from having a huge size, log rotation may be employed. Periodically, the log file may be renamed to a different file and the original log file truncated. For example, the syslog file may be renamed to syslog.1 each day, and new log data written to an empty syslog file afterwards. Since the "tail -F" command keeps track of the file by its name, not by its file descriptor or inode, it is compatible with log rotation.

It should also be noted that the "tail -F" command does not incur significant performance overhead. This is because it does not keep monitoring (polling) the file, but, instead, the host file system issues a notification when an event occurs. Also, this command may run independently in a separate process from the server application that generates logs. Since the write operation to the Soteria Device 110 may be performed by a separate process—and not by the server itself—the access latency to the Soteria Device 110 does not affect the performance of the server.

System Information Integrity Checker

The log information stored and protected by implementations of the disclosed technology may be used for various purposes. An ultimate goal of protecting logs is to detect and to prevent intrusions. Intrusion detection techniques, which are based on analyzing logs, may be implemented either in application software or in Soteria Hardware/Firmware, according to certain embodiments.

Suspicious behavior may also be detected by comparing logs stored by the Soteria Device against those stored in the HDD 540. Since logs in HDD may be erased by an attacker 151, mismatches may indicate a potential attack. Moreover, in some embodiments, the Soteria Device 110 may keep track of file accesses. By using the inotify capability provided by a file system, the history of reading or updating files may be traced. For example, while monitoring a file that contains sensitive information, some embodiments may store the history of reading or modifying the file. This history may provide valuable information for investigation.

In some embodiments, the Soteria Device 110 may also be used for rootkit detection. A rootkit is a kind of malware that hides malicious activities from the administrator by modifying OS kernel. If a Soteria Device keeps the original copy of the kernel image, the contaminated kernel may be easily detected and recovered.

Potential Threats and Defense Mechanisms

Certain embodiments of the disclosed technology were designed with an assumption that an attacker 151 may obtain root privileges at the host system 150, and may make changes to any software component, including OS modules, file systems, and device drivers. Further, it was assumed the attacker desires to remove his/her tracks left before obtaining root privileges. In other words, the attacker wishes to hide all evidence of their intrusion.

In one attack scenario, an attacker 151 may generate a huge amount of dummy logs, so that the old logs would be effectively flushed, or erased, from the Soteria Device 110 as the memory 320 fills. In some embodiments, a threshold-based detection mechanism may be employed to cope with log flooding attacks. For example, if a rate of incoming logs, in terms of events per second (EPS) exceeds a pre-defined threshold for longer than a predefined period of time, a log flooding attack may be declared. Since the range of normal logging rates may vary with the host system, the threshold may be determined by the administrator 161. When an attack is detected (or suspected), an alarm may be sent to the administrator. Also, upon detection, the Soteria Device 110 may intentionally delay any responses to the host system 150, so as to reduce the logging rate. If the responses from the Soteria Device 110 are slowed down, the storing of logs may be delayed, which, in turn, slows down the generation of dummy logs. This reaction may provide ample time for the administrator to find a way to handle the attack. The administrator may shut down the network, or copy existing protected logs to a safe place before valid logs are deleted. In some implementations, the Soteria Device may attempt to offload or transmit older logs, for example, to administrator system 160, before automatic deletion.

In another attack scenario, the adversary may replace the Soteria Device Driver 110 or SATA device drivers so that he/she can issue Soteria Device 110 or SATA commands to the Soteria Device 110 in unexpected ways. By doing this, the attacker may be able to stop logging or start generating dummy logs. However, in some implementations, existing logs that have already been stored in the Soteria Device 110 may not be erased from the host system. Thus, contaminated device drivers may not pose a threat to logs stored on the Soteria Device.

Finally, if an I/O buffer is enabled in any layer of the software, logs stored in the buffer that are not yet stored in the Soteria Device 110 could be removed by the adversary. To avoid such a problematic scenario, in some implementations, the I/O buffer of the SATA or other underlying device driver may be disabled. Moreover, the Soteria Device Driver 560 may not employ a buffer. In the case of the file system 520, the disabling of page buffers could have significant impact on system performance. However, since event notification occurs before the page buffers, page buffers may not be disabled in some implementations.

Certain embodiments of the disclosed technology are described above with reference to block and flow diagrams of systems and methods and/or computer program products according to example embodiments of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some embodiments of the disclosed technology.

The computer-executable program instructions disclosed herein may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A device for protecting log messages, the device comprising:
    a memory configured to store log messages;
    a controller embedded with a computing processor and operationally coupled to the memory, the controller comprising a file system for accessing the memory;
    a first interface for operationally coupling a first computer to the controller, the first interface configured to transmit log messages and file commands between the first computer and the controller; and
    a second interface for operationally coupling a second computer to the controller, the second interface configured to transmit log messages and file commands between the second computer and the controller; and
    the controller is configured to:
    receive instructions from a modified physical device driver at the first computer, the modified physical device driver corresponding to the first interface and modified to use an extended protocol to perform the transmission of log files and commands between the first computer and the controller;
    receive instructions from a logical device driver at the first computer, the logical device driver configured to enable the transmission of log flies and commands between the first computer and the controller without modification of a physical device driver corresponding to the first interface; and
    perform file operations based on file commands received through the first interface and second interface, wherein the controller permits only non-destructive file operations based on commands transmitted through the first interface, but permits non-destructive and destructive file operations based on commands transmitted through the second interface.

2. The device of claim 1, the controller is further configured to automatically delete log messages stored in the memory responsive to the memory reaching a predetermined capacity.

3. The device of claim 2, wherein the deleted log messages include an oldest log message stored in the memory.

4. The device of claim 1, the controller is further configured to determine that a rate of log messages received through the first interface exceeds a predetermined threshold.

5. The device of claim 4, the controller is further configured to, responsive to the determining, delay storage of log messages received through the first interface.

6. The device of claim 4, the controller is further configured to, responsive to the determining, delay responses from the controller to the first computer through the first interface.

7. The device of claim 1, the logical device driver configured to send log files from the first computer to the device without modifying a path associated with the log files at the host system.

8. The device of claim 7, the logical device driver implemented over the physical device driver and comprising a first pipe and second pipe, the first pipe for transmitting file commands to the controller and configured to be written to by the first computer, and the second pipe for transmitting responses from the controller and configured to be written to by the device.

9. The device of claim 1, wherein an I/O buffer of the physical device driver at the host system is disabled.

10. A system for protecting log files, the system comprising:
a device comprising:
a memory configured to store log messages;
a controller operationally coupled to the memory, the controller comprising a file system for accessing the memory;
a first interface for operationally coupling a first computer to the controller, the first interface configured to transmit log messages and file commands between the first computer and the controller; and
a second interface for operationally coupling a second computer to the controller, the second interface configured to transmit log messages and file commands between the second computer and the controller;
the controller configured to perform file operations based on file commands received through the first interface and second interface, wherein the controller permits only non-destructive file operations based on commands transmitted through the first interface but permits non-destructive and destructive file operations based on commands transmitted through the second interface; and
a logical device driver for installation at the first computer and configured to enable communication through the first interface between the first computer and the controller without modification of a physical device driver corresponding to the first interface,
the controller is further configured to receive instructions from the logical device driver at the first computer, and to receive instructions from a modified physical device driver at the first computer, the modified physical device driver corresponding to the first interface and modified to enable communication through the first interface between the first computer and the controller using an extended protocol.

11. The system of claim 10, the controller further configured to automatically delete log messages stored in the memory responsive to the memory reaching a predetermined capacity.

12. The system of claim 11, wherein the deleted log messages include an oldest log message stored in the memory.

13. The system of claim 10, the controller further configured to determine that a rate of log messages received through the first interface exceeds a predetermined threshold.

14. The system of claim 13, the controller further configured to, responsive to the determining, delay storage of log messages received through the first interface.

15. The system of claim 13, the controller further configured to, responsive to the determining, delay responses from the controller to the first computer through the first interface.

16. The system of claim 10, the controller further configured to compress log messages received through the first interface for storage in the memory.

17. The system of claim 10, the logical device driver configured to send log files from the first computer to the system without modifying a path associated with the log files at the host system.

18. The system of claim 10, the logical device driver implemented over the second device driver and comprising a first pipe and second pipe, the first pipe for transmitting file commands to the controller and configured to be written to by the first computer, and the second pipe for transmitting responses from the controller and configured to be written to by the device.

19. The system of claim 10, wherein an I/O buffer of the second device driver at the host system is disabled.

20. A device for protecting log messages, the device comprising:
a NAND memory configured to store log messages;
an Advanced RISC Machine (ARM) based controller operationally coupled to the NAND memory, the ARM-based controller comprising a file system for accessing the NAND memory;
a Serial Advanced Technology Attachment (SATA) interface for operationally coupling a host computer to the ARM-based controller, the SATA interface configured to transmit log messages and file commands from the host computer to the ARM-based controller; and
a Universal Asynchronous Receiver/Transmitter (UART) interface for operationally coupling an administrator computer to the ARM-based controller, the UART interface configured to transmit file commands from the administrator computer to the ARM-based controller and transmit log messages from the ARM-based controller to the administrator computer;
the ARM-based controller is configured to:
receive instructions from a modified physical device driver at the first computer, the modified physical device driver corresponding to the first interface and modified to use an extended protocol to perform the transmission of log files and commands between the first computer and the controller;
receive instructions from a logical device driver at the first computer, the logical device driver configured to enable the transmission of log files and commands between the first computer and the controller without modification of a physical device driver corresponding to the first interface;
perform file operations based on file commands received through the SATA interface and UART interface, wherein the ARM-based controller permits only non-destructive file operations based on commands transmitted through the SATA interface but permits non-destructive and destructive file operations based on commands transmitted through the UART interface; and
automatically delete older log messages stored in the NAND memory responsive to the NAND memory reaching a predetermined capacity; and
wherein the device is configured to reside on an expansion card to the host computer.

* * * * *